(12) United States Patent
Colin et al.

(10) Patent No.: US 8,129,950 B2
(45) Date of Patent: Mar. 6, 2012

(54) BATTERY MODULE, PACK OF MODULES

(75) Inventors: Jacques Colin, Quimper (FR);
Jean-Jacques Jestin, Fouesnant (FR);
Christian Sellin, Concarneau (FR)

(73) Assignee: BATSCAP, Ergue Gaberic (FR)

( * ) Notice: Subject to any disclaimer, the term of this patent is extended or adjusted under 35 U.S.C. 154(b) by 391 days.

(21) Appl. No.: 12/526,022

(22) PCT Filed: Feb. 1, 2008

(86) PCT No.: PCT/EP2008/051287
§ 371 (c)(1),
(2), (4) Date: Aug. 5, 2009

(87) PCT Pub. No.: WO2008/101788
PCT Pub. Date: Aug. 28, 2008

(65) Prior Publication Data
US 2010/0007311 A1    Jan. 14, 2010

(30) Foreign Application Priority Data
Feb. 6, 2007   (FR) ...................................... 07 00827

(51) Int. Cl.
*H02J 7/00* (2006.01)
*G01N 27/416* (2006.01)
*H01M 6/42* (2006.01)

(52) U.S. Cl. .......................... 320/134; 429/149; 324/434
(58) Field of Classification Search .................... 320/134
See application file for complete search history.

(56) References Cited

U.S. PATENT DOCUMENTS

| | | | |
|---|---|---|---|
| 5,204,611 A | 4/1993 | Nor et al. | |
| 5,773,962 A | 6/1998 | Nor | |
| 6,025,695 A | 2/2000 | Friel et al. | |
| 6,104,967 A | 8/2000 | Hagen et al. | |
| 2005/0077878 A1 | 4/2005 | Carrier et al. | |
| 2006/0028182 A1 | 2/2006 | Yang et al. | |
| 2006/0028183 A1 | 2/2006 | Izawa et al. | |
| 2006/0123622 A1 | 6/2006 | Guy | |
| 2006/0132089 A1 | 6/2006 | Ambrosio et al. | |
| 2006/0193095 A1 | 8/2006 | Hunter et al. | |
| 2006/0263688 A1 | 11/2006 | Guyomard et al. | |
| 2007/0169338 A1 | 7/2007 | Descamps | |
| 2008/0076025 A1 | 3/2008 | Guyomard et al. | |

FOREIGN PATENT DOCUMENTS

| | | |
|---|---|---|
| DE | 196 14 435 | 4/2006 |
| EP | 0 998 778 | 4/2004 |
| EP | 1581978 | 8/2008 |
| FR | 2849280 | 6/2004 |
| WO | WO99/31752 | 6/1999 |
| WO | WO0193398 | 12/2001 |
| WO | WO2004059776 | 7/2004 |
| WO | WO2004059777 | 7/2004 |

*Primary Examiner* — M'Baye Diao
(74) *Attorney, Agent, or Firm* — Harness, Dickey & Pierce, P.L.C.

(57) ABSTRACT

The application concerns a battery module, comprising cells, two external terminals, a message communication infrastructure, a module control unit comprising a message processing unit, connected to the infrastructure to send and receive messages. According to the application, at least two of the message systems chosen from among:
 a first message system for cell characterization,
 a second message system for cell forming, and
 a third message system for utilization of a battery pack comprising several modules connected via their user terminals, when the pack is associated with a consumer machine for the purpose of supplying it with electric energy, are provided in the message processing unit, which is able to be configured into any one of the message systems.

22 Claims, 5 Drawing Sheets

FIG.8 ic # BATTERY MODULE, PACK OF MODULES

CROSS REFERENCE TO RELATED APPLICATIONS

This application is a National Phase Entry application of International Application No. PCT/EP2008/051287, filed Feb. 1, 2008, which claims priority to French Application No. 07 00827, filed Feb. 6, 2007; both of which are incorporated by reference herein.

BACKGROUND AND SUMMARY

The invention concerns a battery module, having rechargeable and dischargeable electric energy storage cells.

One area of application of the invention is power batteries such as for example those used as power source to drive a traction motor drive in electric vehicles. Evidently, the battery module may have other applications, e.g. for the powering of fixed apparatus. These applications to power batteries make use of lithium-metal-polymer cell technologies for example. In a module, the cells are connected between two external connection terminals. A battery may, for example, consist of several modules having their connection terminals connected in series.

From document EP-B-998 778, a battery is known which contains a main computer controlling modules via a communication infrastructure during charging and discharging operations. Each module is able to operate in network mode or stand-alone mode. A module changes over from network mode to stand-alone mode in response to absence of communication connectivity with the main computer.

One of the problems found with each battery module is the ability to adapt to the different environments encountered throughout its lifetime. In particular, if each module comprises a communication infrastructure, it must be possible to use this infrastructure in different environments to avoid having to provide for a communication infrastructure per environment.

More generally, one disadvantage is that the use of the battery by different users throughout the product's lifetime is based on different material and software architectures, and leads to successive context changes which are cumbersome and detrimental to the reliability of the system. Whether the architecture is single-module (research and development, all low-voltage applications), networked multi-module (production or maintenance operations, world of industrial automation) or modules in series (high-power high-voltage applications, automotive applications), the embodiments chosen for the module in the different environments can lead to different systems which are derived from different technologies and are incompatible.

Additionally, despite the envisaged specialization, some elements common to the systems will subsist such as minimal operating and safety constraints, minimal characteristics to obtain from the end product, single form of battery module consisting of a fixed number of cells. Specializing a battery module, by providing for embedded equipment varying from one module to another, soon comes up against a dead-end. This specialization effectively assumes penalizing immobilization of the battery module or battery, management of the supplies of the different equipments, provision for management of the technical status of the set of batteries, the use of production tooling particular to each area of application, these all having prohibitive costs.

The invention sets out to obtain a battery module which overcomes the above-cited disadvantages and facilitates the utilization of one same communication infrastructure in different environments. For this purpose, a first subject of the invention is a battery module comprising:
- a plurality of rechargeable and dischargeable, electric energy storage cells,
- two external terminals for cell utilization,
- a message communication infrastructure comprising at least one communication access with the outside of the module,
- a module control unit, comprising a message processing unit, connected to the communication infrastructure to send and receive messages over the communication infrastructure, characterized in that at least two of the message systems chosen from among:
- a first message system for cell characterization,
- a second message system for cell forming, and
- a third message system for utilization of a battery pack comprising several modules connected via their user terminals, when the pack is associated with a consumer machine for the purpose of supplying it with electric energy, are provided in the message processing unit, which is configurable into any one of the message systems provided thereupon for utilization of the communication infrastructure.

Therefore, with the third message system, the communication infrastructure can be used by a machine or a consumer equipment which needs to be supplied with electricity by the cells. With the first message system, the communication infrastructure enables dialogue with all the cell measuring functions provided on the module, for example for the purpose of diagnosing module status before the battery module or battery is installed on the consumer equipment. Before utilization of a module, the module is first subjected to a forming operation of its cells using a forming device. By means of the second message system, the industrial logic controller of this forming device enables use of the communication infrastructure to collect the data required for this forming from the module.

According to other characteristics of the invention:

The module control unit comprises:
means to receive information for on message system configuration,
a permanent memory (32) to store the information on message system configuration,
automatic configuration means for configuring its message processing unit as per the message system corresponding to the information on message system configuration present in the permanent memory.

The automatic configuration means comprise means to poll the value of the information on message system configuration present in the permanent memory and means for automatic selection of the message system corresponding to the value indicated by this information on message system configuration.

The communication infrastructure is of bus type, to allow connection of the external access to a communication bus.

The first message system comprises means enabling utilization of the module in a first material environment comprising the following elements connected via their message communication access to the communication bus: a device to download message systems onto the module, comprising means to send to the module the information on configuration of the message processing unit of the module as per the first message system, a charger connected to the module via a transport link transporting charge electric current for the purpose of charging its cells with electric energy, a man-machine interface to enable a user to send operating command messages to the charger and/or to the module and to receive from the charger and/or module the statuses thereof.

It comprises means to measure the voltage and current of the cells and the temperature of the module, the control unit being able to send the measurements over the communication infrastructure by at least one measurement-sending message provided in each message system.

The message processing unit comprises means to receive a message from the downloading device, conveying at least one calibration parameter for the measuring means in the second message system, and means to store said calibration parameter in a memory.

The first message system is asynchronous.

The communication infrastructure is of bus type, to allow connection of the external access to a communication bus, the second message system comprises means enabling utilization of the module in a second material environment for cell forming, comprising the following elements connected via their message communication access to the communication bus: a plurality of modules whose user terminals are not connected together, at least one charger connected to the modules via at least one transport link for transporting charge electric current for the purpose of charging their cells with electric energy and able to be placed in charge-on status or charge-off status, a forming device to form the cells of the modules comprising a discharge bank connected to the user terminals of the modules and able to be placed in discharge-on status of the module cells or discharge-off status of the module cells, the forming device comprising means to send a message of charge-on command to the charger and of discharge-off command to the discharge bank and a message of charge-off command to the charger and of discharge-on command to the discharge bank.

The message processing unit comprises means to produce at least one message from among the following messages in the second message system:

a message from the module to the associated charger carrying the charge setpoint to charge the module cells, a message from the module to the forming device carrying the statuses and alerts of the module, the message processing unit comprises means to receive a status message sent by the charger to the module, said status message carrying the status of the charger and any possible alert of the charger, to cause the module to transition to a safe fall-back position in the event of absence of said charger status message or if said status message of the charger indicates an alert or a voltage or temperature status lying outside prescribed tolerances.

The second message system is in CANopen format.

The communication infrastructure is of bus type, to enable connection of the external access to a communication bus, the third message system comprises means allowing utilization of the module in a third material environment for cell utilization comprising the following elements connected via their message communication access to the communication bus: a plurality of modules whose user terminals are connected together, at least one charger connected to the modules via at least one transport link transporting charge electric current for the purpose of charging their cells with electric energy, a supervisor of the consumer machine.

The message processing unit comprises means to produce charge setpoints for its cells, in the third message system, intended for a charger.

In the third message system, the module is able to be configured as master module or as slave, the message processing unit of the module configured as master module comprising means to send command messages to the other slave modules, the message processing unit of the module configured as slave module comprising means to carry out command messages from the master module.

The module being master, the message processing unit comprises means to produce at least one message from among the following messages in the third message system:

a first message sent from the module to the supervisor sending at least one of the data items from among the status of the battery pack, the total voltage of the battery pack, the level of the battery pack, a maximum permitted discharge current and a maximum permitted cell regeneration current, a second message for sending at least one alert from the module to the supervisor, a third message for sending from the module to the supervisor the value of the current supplied by or absorbed by the pack and/or the value of the maximum temperature of the pack.

The module being master, the message processing unit comprises in the third message system a means to receive a fourth message for sending from the supervisor to the module at least one of the following:

an alert acknowledgement, a consumption request, causing transitioning of the pack modules to active mode, and when the modules of the pack have changed over to active mode, the sending by the module of a transition-to-active-mode message to the supervisor for authorizing functioning of the consumer machine, a request to place the modules of the battery pack on standby, a request to shut down the modules of the battery pack.

The module being master, the message processing unit comprises means to transmit a synchronization frame for the messages of the modules in the third message system.

The communication infrastructure is of CAN bus type.

The messages of the first, second and third message systems have as order of priority for transmission on the bus:

very high priority for the message transmitting information on message system configuration, very high priority for transmission of a synchronization frame by the master module, high priority for transmission by the modules of alerts, data, setpoint to the charger, high priority for transmission by the charger of a fault message or status message, high priority for transmission of commands from the master module to the slave modules, low priority for transmission from the master module to the supervisor of first second and third messages, low priority for transmission of the fourth message from the supervisor to the master module.

The invention concerns also a pack of several battery modules according as described above, characterized in that the communication infrastructures of the modules are connected to a communication bus for the transmission of the messages.

According to other characteristics of the invention:

The user terminals of the modules are electrically connected together to utilize the battery pack, only one of the modules is configured as master module, whereas the other modules are configured as slave modules of this master module for the messages of the third message system, so that the slave modules transmit or receive their messages of the third message system via the master module.

Each module comprises means to produce data on the functioning of the cells of the module, the master module comprises means to transmit a synchronization frame on the bus so that the modules transmit their data-carrying messages on the bus at prescribed times different from each other.

BRIEF DESCRIPTION OF THE DRAWINGS

The invention will be better understood on reading the following description given as a non-limiting example with reference to the appended drawings in which.

DETAILED DESCRIPTION

First, a general description is given below of a battery module.

Battery Module

Figure 4:
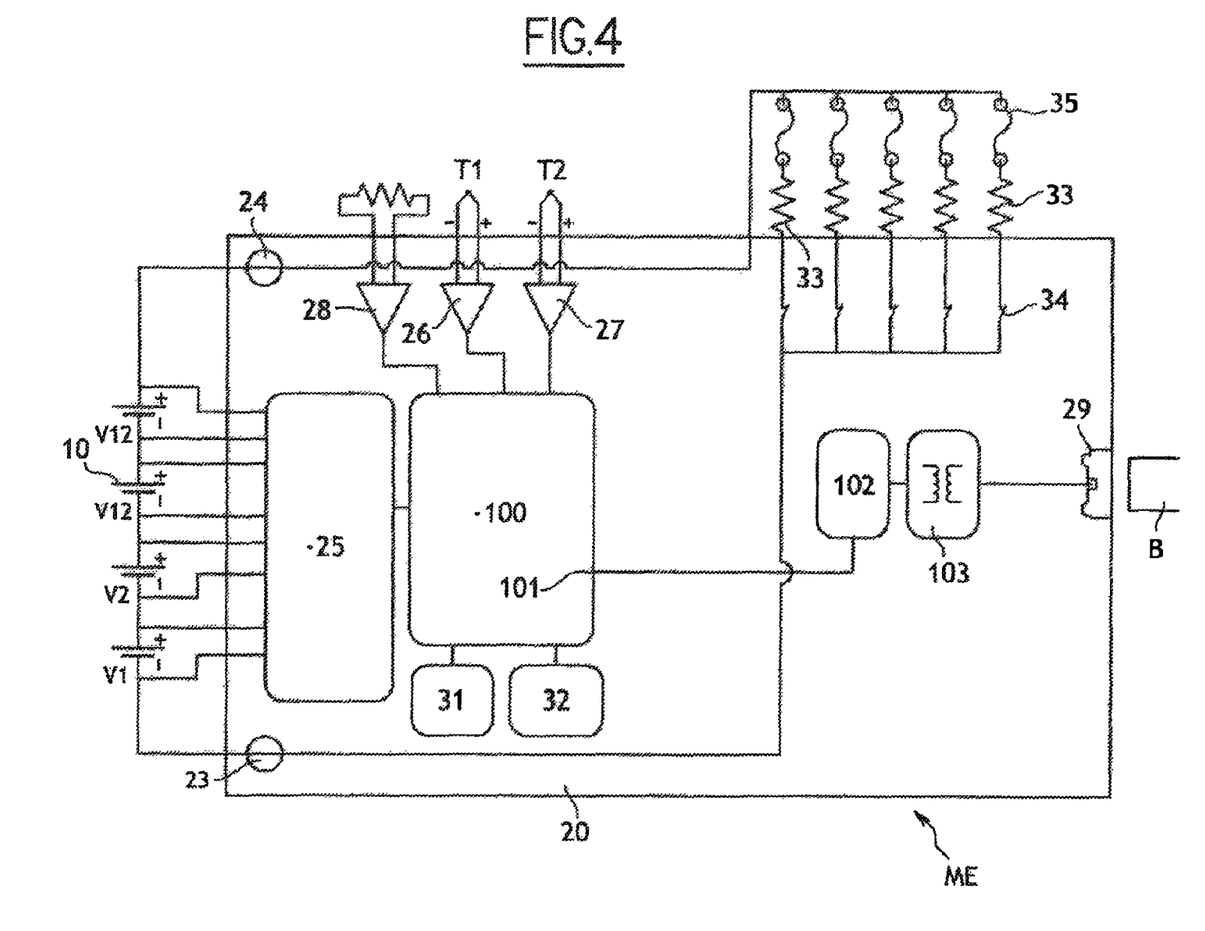
FIG. 4 schematically illustrates a battery module according to the invention.

FIG. 4 shows a battery module ME according to the invention which, between two first external user terminals 23, 24, comprises a number m of identical cells 10 in series, which are rechargeable and dischargeable, and a control unit 20 controlling its own cells 10. This control unit 20 may, for example, be in the form of a printed electronic circuit board.

In one embodiment, the cells consist of an assembly of films, e.g. in lithium-metal-polymer. The total thickness of these films is less than 300 micrometers and for example around 150 micrometers. The nominal operating temperature of the cells is higher than 20° C., e.g. 90° C. for lithium-metal-polymer technology.

A battery or battery pack can consist of one or more modules ME connected via their user terminals 23, 24, some or all of the modules ME possibly being in series or parallel to each other via their terminals 23, 24. If several modules ME are provided, the charge circuit of these modules ME may, for example, have a single charger for all the modules, or one charger per module. Therefore, in the remainder hereof, if several individual chargers CHG are provided, each associated with a different module ME, these individual chargers CHG may be replaced by a single charger CHG for all the modules.

In the embodiment illustrated FIG. 4, the module ME comprises one or more electric heating members or plates 33 to heat its associated cells 10 to their nominal operating temperature, for example having first and second heating members 33 in two different first and second regions: a first wall region and a second central region. Each heating member 33 is in series with a heating switch 34 whose opening and closing is controlled in heat regulation phases by a unit 100 described below to cause the heating or non-heating of the cells by the member 33. Additionally, a protective thermal fuse 35 is provided in series with the member 33. Also, the module ME in its unit 20 comprises a unit 25 to measure the voltage at the terminals of each of its associated cells 10, at least one unit 26 to measure the temperature of the module and a unit 28 to measure the current of the cells 10. For example, units 26, 27 are provided to measure the temperature of the module in the different heating regions, e.g. a unit 26 to measure temperature in the outer wall region of the module and a unit 27 to measure temperature in the central region of the module. The measurements of voltage, temperature and current of units 25, 26, 27, 28 are sent to the computer and control unit 100 of unit 20, comprising a microcontroller for example. Unit 100 is provided with a RAM memory 31 and a permanent back-up memory 32, for example of EEPROM type.

In addition, the module comprises a communication infrastructure enabling the control unit 100 to communicate with the outside. This communication infrastructure is of a predetermined type, identical for the modules of one same battery. The communication infrastructure of each module comprises an access 29 to outside, which is intended to be connected to an external communication bus B of pre-determined type, to exchange information on this bus B with other entities which may be battery modules of other devices. In FIG. 4, this communication infrastructure of the module comprises signal conversion members 102, 103 connecting an access 101 for transmitting/receiving signals from the unit 100 to the external communication access 29 of pre-determined type, to convert signals received on the external access 29 into signals compatible with the unit 100 which have to be received on access 101 and to convert the signals transmitted by the unit 100 from access 101 into signals of pre-determined type on access 29 for transmission to outside. The pre-determined type of communication infrastructure is designed for example to connect the external access 29 to a CAN bus, i.e. a multiplexing network, the member 102 in this case being a CAN interface.

In addition, the module ME may also comprise a series link connected to the control unit 100 via another access thereof, not shown. This series link is of RS232 type for example. In unit 100, for example in its permanent memory 32, different first, second, and third message systems are stored, to be used respectively in first, second and third environments of the module ME, having different connection architectures to the bus B which are described below.

Each of the three environments is first described below, followed by a description of each of the three associated message systems.

First Environment for Cell Characterization

Figure 1:
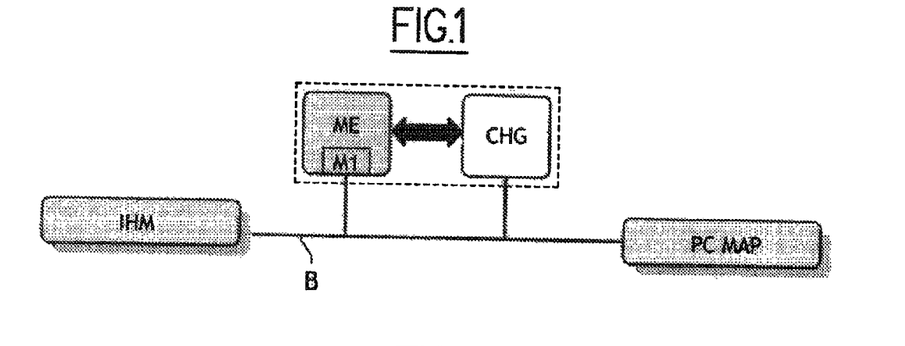
FIGS. 1, 2 and 3 respectively illustrate first, second and third environments of a battery module according to the invention.

FIG. 1 illustrates the battery module ME in the first environment used for characterization of its cells C. This first environment has an architecture in which the following elements are each linked via their access to the communication bus B:

Battery module ME whose unit 20 must perform the following functions, which are found in the other operating architectures but with a network orientation:
- local functions linked to the microcontroller and circuit board supply,
- acquisition and measurement of physical magnitudes of the battery: voltage of each cell, overall voltage of the module, current circulating in the module, internal temperature of the module in two defined heating regions: peripheral region of the module or wall of value T1 and central region of value T2,
- thermal management of the battery: thermal regulation via control of the heating members,
- management of battery module charge and driving of the charger,
- operating safety and system alerts,
- communication via bus B.

A charger CHG comprising output terminals for electric connection to terminals 23, 24 of the cells of the module ME, for their charging with electric energy via a charge cable, as shown by the thick double arrow. To charge the cells, the charger CHG must first ensure heating thereof by the heating members 33 during an initial rise-in-temperature phase until their nominal operating temperature is reached, and then charge the cells during a heat regulation phase at this nominal operating temperature in which the heating switches 34 are under open/close control. Although independent for the security aspect of operation, the charger functions as a peripheral of the module ME and translates the setpoint received from the module ME as a voltage on its output terminals.

A man-machine interface IHM to enable a user to send commands, such as start and stop commands, commands to display battery module status on a screen, A device, designated PCMAP, allowing downloading onto bus B of the programme(s) to be stored in the unit 100 of the module ME for its operation.

This PCMAP device therefore allows downloading of the first, second and third message systems onto unit 100 of the module ME. The first message system M1 is provided on the module ME to exchange messages on the communication bus B with the elements of this first environment, and is called the cell characterization message system. In this first environment, the messages of the first message system are sent asynchronously.

Second Environment for Cell Forming

Figure 2:
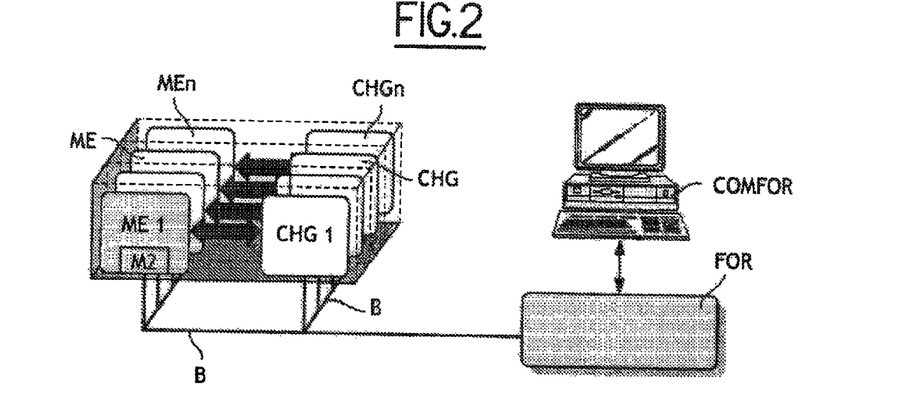

In FIG. 2, the battery module ME is shown in the second environment used in the step for the fabrication process of the cells 10, called cell forming. This forming consists of electrochemical conditioning of each cell 10 which will impart thereto the minimum characteristics required to ensure energy storage. Forming of the cells is defined in a format of a fixed number m of cells (e.g. 12 cells). This second, forming environment uses the functions of the module ME in the first environment. This second forming environment has an architecture in which the following elements are each linked via their access to the communication bus B:
- several modules ME, namely n modules ME1 to MEn electrically independent on their electric terminals 23, 24,
- the n chargers CHG1 to CHGn respectively associated with modules ME1 to MEn and each conforming to the charger CHG described above, each charger having a charging link represented by the double arrow with its associated module,
- a forming device FOR connected to terminals 23, 24 of the cells 10 of module ME for the forming thereof. This forming device FOR comprises a programmable industrial logic controller (industrial automaton) for example, having a software driving the forming process. This forming controller is connected to bus B and to a configuration control unit COMFOR.

Forming corresponds to particular cycling of the cells and is controlled by the forming device FOR. In general, by cycling is meant a succession of cell charging and discharging cycles. In one embodiment, the charger CHG is supplied with electricity by a mains connection and has interrupt means INTCH to cut off this supply whose position can be controlled from a control access ACCINTCH. For charging, the charger CHG is powered. For discharging, the power supply of the charger CHG is cut off.

Figure 10:
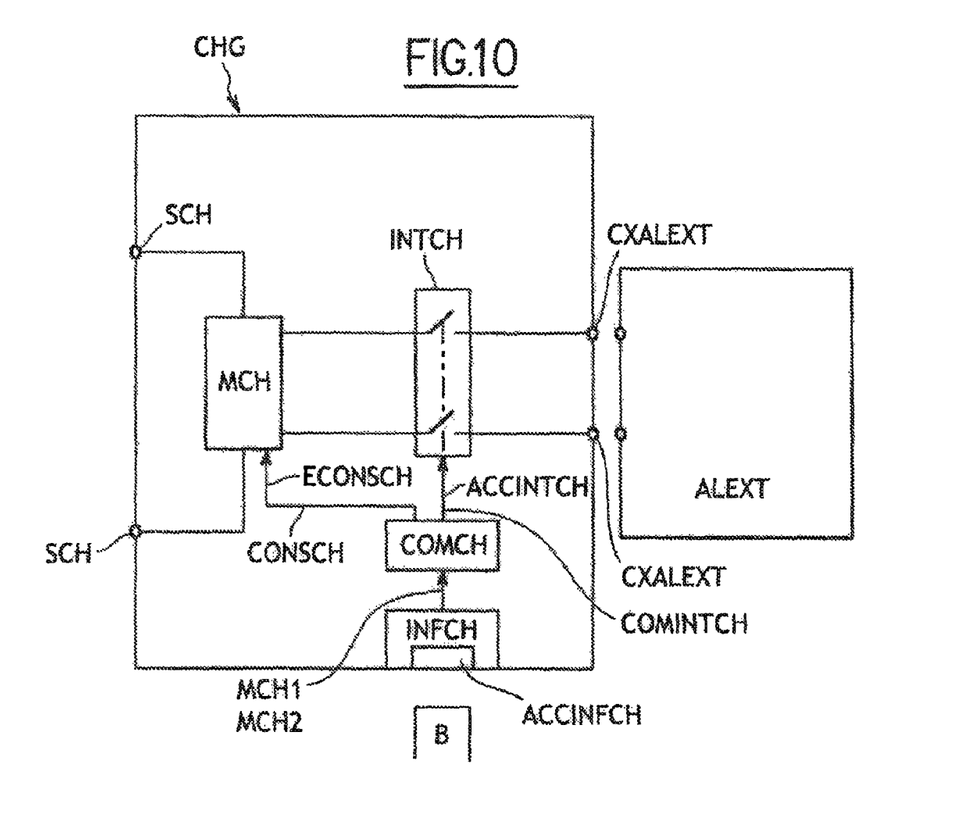
FIG. 10 schematically illustrates one embodiment of a charger intended to cooperate with a battery module according to the invention.

In the embodiment shown in FIG. 10, the charger CHG for charging the battery module comprises:
- output terminals SCH intended to be electrically connected to the cells of the module,
- means MCH to charge the cells with electric energy from a prescribed electric supply ALEXT as per a quantitative charge setpoint CONSCH, the charging means MCH being connected to the output terminals SCH and possibly having an input ECONSCH to receive the quantitative charge setpoint CONSCH,
- an electric connection CXALEXT intended to be connected to the prescribed external electric supply ALEXT,
- interrupt means INTCH between the electric connection and the charging means, whose conduct and interrupt positions can be controlled,
- a communication infrastructure INFCH comprising at least one communication access ACCINFCH with the outside of the charger, capable of receiving at least one message MCH1 comprising a supply switching command COMINTCH and at least one message MCH2 containing the quantitative charge setpoint CONSCH,
- automatic control means COMCH connected to the communication infrastructure INFCH to command the position of the interrupt means INTCH according the supply switching command, either a conduct command to cause charging or an interrupt command to cut off charging, and to impose on the charging means the quantitative charge setpoint CONSCH, for example by transmitting the quantitative charge setpoint CONSCH onto the input ECONSCH to which the control means COMCH are connected.

In the above-described embodiment, the communication infrastructure INFCH of the charger is designed to be connected to the bus B.

Figure 9:
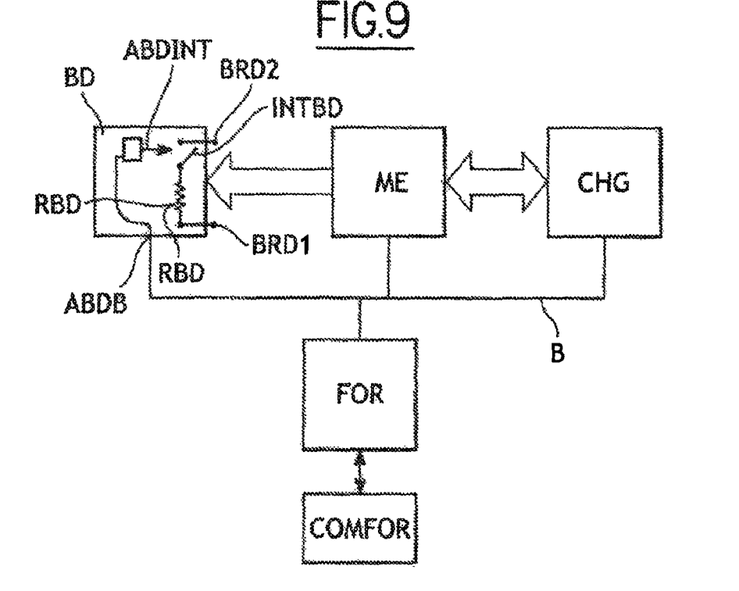
FIG. 9 schematically illustrates the electric circuit used in the second environment.

When being formed, the cells 10 of the modules ME are connected to a discharge bank BD as shown on FIG. 9, this discharge bank being absent in the first and third environments. This discharge bank BD, between two electric terminals BRD1 and BRD2 for electric connection to user terminals 23, 24 of the module ME, comprises a discharge resistance RBD in series with interrupt means INTBD whose position can be controlled from an access ABDINT. This discharge bank BD also comprises an access ABDB connected to the communication bus B.

The forming device FOR, via the bus B, transmits supply switching commands to the charger CHG to cause it to transition to charging or to charge cut-off. The forming device FOR, via the bus B, transmits messages to the module ME indicating whether the module ME is placed on charge or discharge. The forming device FOR, via the bus B, transmits to the access ABDINT switching commands for the interrupt means INTBD so that the interrupt means INTBD is either closed to discharge the cells of module ME on resistance RBD, in which the charger CHG is cut off from the cells of the module ME, or the interrupt means INTBD is opened to charge the cells of the module ME by the charger CHG in which the resistance RBD is cut off from the cells of the module ME. The commands for the members INTCH/AL-EXT and BD can transit via the bus B or via dedicated electric links firstly between the forming logic controller FOR and the interrupt means INTCH and secondly between the forming logic controller FOR and the discharge bank BD.

In the forming architecture, the forming device FOR is the master entity of the network, and the other elements ME, CHG are slave peripherals. Forming of the cells causes the modules to operate in a network, but independently. This forming architecture, on the bus B, uses the CANopen protocol for example (developed by the users' and manufacturers' group CAN in Automation—Cia) which is a specialization of the CAN standard with a CAL application layer (released as CANopen by the group CAN in Automation—Cia) and is intended to allow its use in compatible industrial equipments. In the CANopen embodiment, the speed is 125 Kbaud for example.

The second message system M2 is provided on the module ME to exchange messages on the communication bus B with the elements of this second environment, and is called the cell forming message system. The second message system corresponds to encapsulation of the first message system with additional messages which are indicated below.

Third Environment for Cell Utilization

Figure 3:
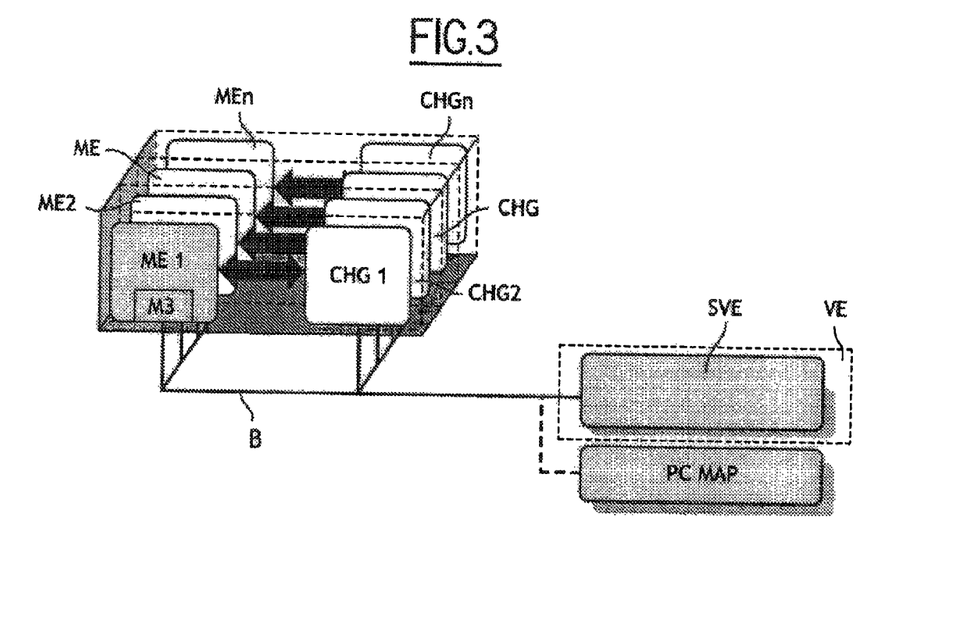

In FIG. 3, the battery module ME is shown in the third environment, in which the module ME essentially supplies electric energy from its terminals 23, 24 to a consumer machine VE e.g. a motor drive of an automotive vehicle, in which the module ME is present. This third utilization environment has an architecture in which the following elements are each connected via their access to the communication bus B:

several modules ME, namely n modules ME1 to MEn connected via their electric terminals 23, 24, to constitute a battery or battery pack, whose two end terminals 23, 24 are connected to the machine VE by means, not shown, so that the cells of the modules supply the machine with electric current. The modules ME lie in series for example, via their terminals 23, 24 for application to the supply of a motor drive in an automotive vehicle.

the n chargers CHG1 to CHGn associated with modules ME1 to MEn respectively and each conforming to the charger CHG described above, each charger having a charging link, represented by the double arrow, to its associated module, a supervisor SVE of the consumer machine VE, this supervisor SVE having a computer present on the machine VE, a device, designated PCMAP, allowing the downloading onto the bus B of the programme(s) to be stored in the unit 100 of the module ME for its functioning. In an extended version of this third environment, this device PCMAP, in addition to its version in the first environment, allows the following operations:

downloading, from the modules ME, via the bus B, of the software present on the modules ME, configuration of the battery pack: definition of the network of modules ME1 to MEn (address, number of modules ME, CAN communication speed, message system) via the CAN bus or a series link e.g. of RS232 type, additionally provided on each module and connected to its unit 100 as is described below, the sending of commands to the battery, supervision of the system, reading, display and recording of measurements made by the battery, automatic control of cabling between the modules ME and the chargers CHG.

This third architecture is organized around a dialogue structure, master-slave and master-supervisor. One module ME, designated ME1 in FIG. 3, is master while the other elements, except the supervisor SVE, are slaves thereof. To communicate with modules ME1 to MEn, the supervisor SVE communicates with the master module ME1, which then communicates with the slave modules ME2 to MEn.

In one embodiment, the bus B is formed of a primary communication network and a secondary communication network. The modules are connected together by the secondary communication network, internal to the battery, e.g. of CAN type i.e. a multiplexing network. The master module ME1 is responsible for controlling the secondary communication network. For this purpose, each of the master and slave modules comprises a communication interface with the secondary network. In addition, among the modules ME, solely the master module ME1 comprises another interface with the primary communication network with the outside, e.g. of CAN type. The supervisor SVE and the chargers also comprise an interface connected to the primary network.

The separation of the two communication networks, primary and secondary, can be considered from a logic or physical viewpoint; in other words these two networks may or may not be interconnected. Each slave module controls the integrity of its measurements before transmitting the same via the secondary network to the master module. In the first and third environments, the bus B acts as data distribution bus via messages, in the first and third message systems, not containing any addressee address.

For application to the supply of electricity to a motor drive in an automotive vehicle, a battery pack consists of a maximum number m of 2 to 15 modules depending upon the definition of the chosen message system. In one example of embodiment, the packs consists of 9 or 10 modules with a total maximum voltage of 360 or 400 V and a maximum power in the beginning of use of 72 or 80 kW. The modules of architecture VE are electrically connected in series for accumulation of unit voltages.

The third message system M3 is provided on the module ME to exchange messages on the communication bus B with the elements of this third environment, and is called a cell utilization message system. Each module receives an address which determines its electric allocation. Therefore, the master module ME1 has its negative pole 23 connected to the Zero Volt of the pack, while the module MEn of highest rank has its positive pole 24 connected to the positive voltage of the battery pack. Internally, the master module ensures driving of the internal heating, charging and discharging processes, management of the different operating modes to the scale of the pack, processing of external commands, of alerts and of the safety aspect of pack functioning. The master module ME1 also ensures global synchronization of the data sent by the modules ME1-MEn on the bus B for best distribution of network load and reliability of exchanges.

For a charging circuit with a single charger, the master module ME1 drives the charger CHG by sending it setpoints via the bus B. For a charging circuit with individual chargers CHG associated with the modules ME, each module ME1 to MEn drives its associated charger CHG1 to CHGn by sending it its own setpoints via the bus B. The chargers(s) CHG transform a setpoint read on the bus B into an output voltage value on its charge terminals.

Externally, the master module ME1 communicates with the supervisor SVE. Exchanges of information between the master module ME1 and the supervisor SVE comprise:

from the master module ME1 to the supervisor SVE: a message describing the status of the battery and synthesis values, a message containing system alerts and associated load shedding, from the supervisor SVE to the master module ME1: a common control and information message on the status of the machine VE. This message will then be processed by the master module ME1.

Configuration of a Message System

In each module ME, the control unit 100 is able to be configured to operate with any one of the first cell characterizing message system, the second cell forming message system and the third cell utilization message system. By default, a module ME is configured as a matter of course in one of the message systems e.g. the first. For example, to configure the module ME for a message system, information on message system configuration is sent to it from an external element, which therefore has means to send said information on configuration of the message system.

n the first environment, the PCMAP device sends information for configuration of the first message system to the module ME. When the modules ME are in the second environment, the configuration control unit COMFOR sends them information for configuration of the second message system. When the modules ME are in the third environment, the PCMAP device sends information for configuration of the third message system to the modules ME. In the remainder hereof, these devices PCMAP and this configuration control unit COMFOR are called configuring elements in the different environments.

In the embodiment illustrated in the figures, the information for configuration of the message system is conveyed to unit 100 of the module ME by the communication bus B. In non-illustrated embodiments, the information on configuration of the message system is conveyed to the unit 100 of the module ME by communication means other than the bus B, e.g. by the series link mentioned above, the means for sending information on configuration of the message system then being connected to this other communications means of the module ME.

The unit 100 of each module ME comprises means to receive the information on configuration of a message system. When the information on message system configuration is received by unit 100 of the module ME, the unit 100 stores this information in the permanent memory 32. The unit 100 of each module ME comprises means to poll the value of the information on message system configuration present in the permanent memory 32 and means for automatic selection of the message system corresponding to the value indicated by this information on message system configuration. This polling and this selection are performed for example whenever a message is received by the unit 100 on the bus B.

The control unit 100 of each module ME therefore comprises means for automatic configuration of its message processing unit according to the message system corresponding to the information on message system configuration present in the memory. Therefore the message processing unit will process the messages received or to be sent to the bus B as messages belonging to the message system selected by the information on message system configuration. As soon as communication via the bus B is operational on the pack or module, the user has access by the configuring element to the configuration functions of each module which are described below in the example shown FIG. 5. In the configuring element PCMAP or COMFOR, the configuration interface requires the user to know the serial number of the boards of the ME modules to be configured, which is the discriminating element between all the computers connected to the network since it is written in the permanent memory during manufacture of the board.

Figure 5:
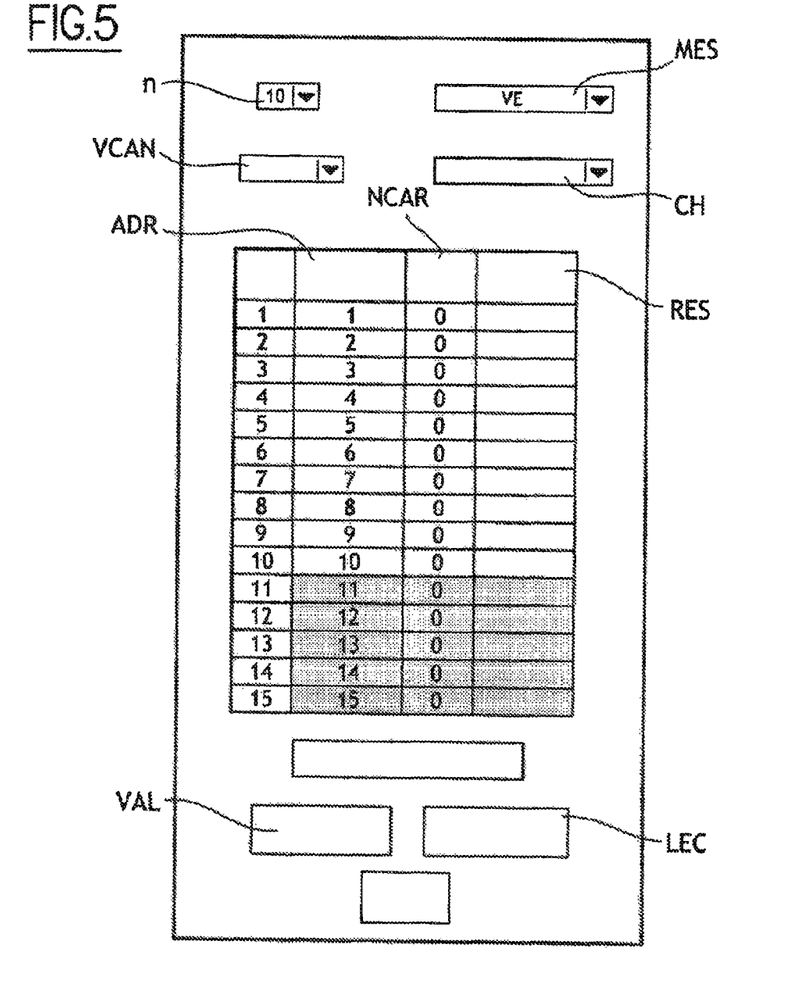
FIG. 5 schematically illustrates a graphical exemplary configuration interface for a message system in one of the environments of FIGS. 1, 2 and 3.

The user first selects the elements defining the network architecture: number n of modules ME in the pack, identifier of the chosen message system MES corresponding to the information on message system configuration, speed VCAN of the bus CAN, architecture CH of the charging circuit between the modules ME and the charging entities thereof, possibly being a single charger for all the modules or one charger per module. Next, in the column NCAR the serial number is entered opposite the pack address ADR of the module ME, which kept in the pack (for example, address 1 for the first characterization architecture). Next, the sending of the new configuration information is validated by pressing validation key VAL. A configuration result column RES then indicates whether the operation has or has not been successful. The configuring element also comprises a configuration verification function, to verify that the pack or module is in an expected configuration by pressing on the configuration read key LEC. The configuration result column RES then indicates in response whether all the modules are in the configuration displayed in the menu field defining the message system MES.

Figure 6:
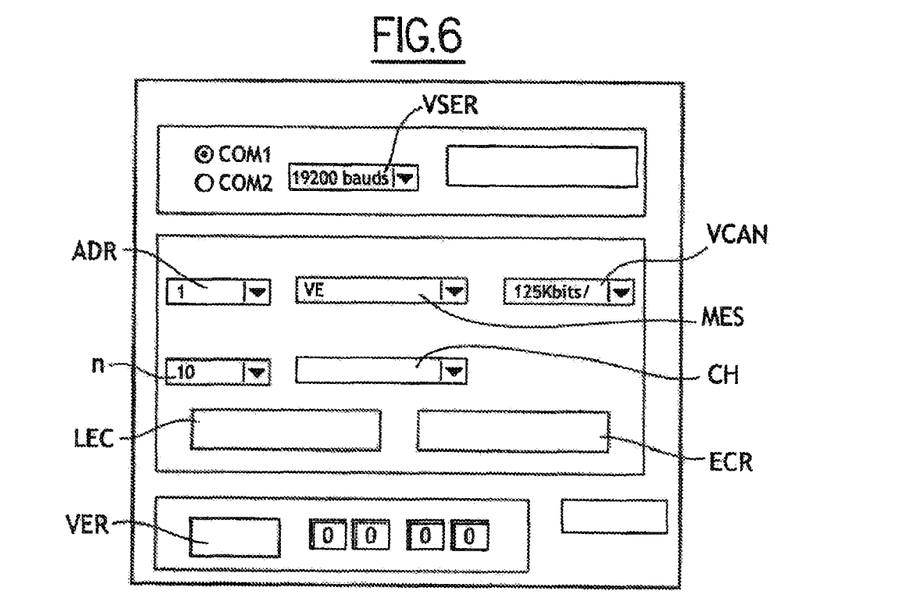
FIG. 6 schematically illustrates another graphical exemplary interface for a message system configuration in one of the environments of FIGS. 1, 2 and 3.

FIG. 6 shows a variant of the configuration interface in FIG. 5 using communication means other than the bus B, such as a series link as mentioned above. A function VSER allows configuration of the parameters of the series link, such as its speed in bauds. The write function ECR is used to write the chosen configuration after selecting the address ADR of the module ME, the identifier of the message system MES, the speed VCAN, the number n of modules ME, the architecture of the charging circuit CH. This function is valid irrespective of the initial configuration. The configuration read function LEC allows reading of the corresponding values for ADR, MES, VCAN, n, CH. An annex function VER also allows reading of the version of software present in the modules ME.

First Message System for Cell Characterization

Figure 7:
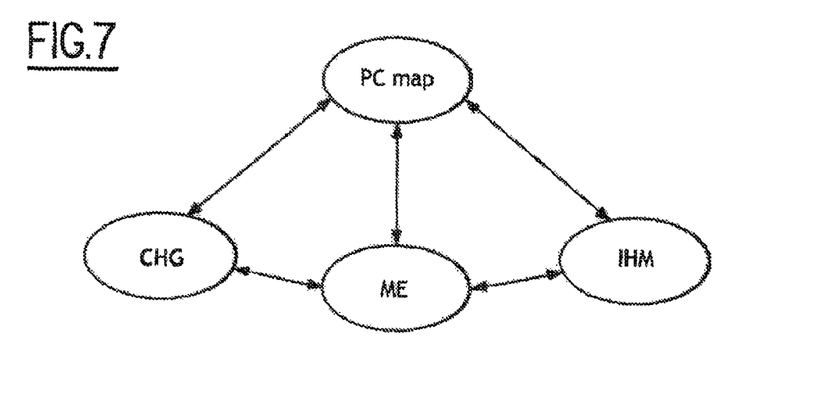
FIG. 7 schematically illustrates exchanges of messages between the different elements of a first message system.

The first message system provides for exchanges of messages represented by the arrows in FIG. 7, namely:

between the device PCMAP and the charger CHG,
between the device PCMAP and the module ME,
between the device PCMAP and the interface IHM
between the module ME and the charger CHG
between the module ME and interface IHM.

The information conveyed by these messages on the bus B comprises one or other of the following for example:

| Energy module Transmit: | Energy module Receive: |
|---|---|
| Physical magnitudes | Commands |
| Converted gross values | Battery parameters |
| Statuses | Communication speed |
| Alerts | Real parameters after calibration |
| Setpoint | Charger statuses |
| Date | |

-continued

| Charger Transmit: | Charger Receive: |
|---|---|
| Statuses Alerts | Setpoint Test commands |
| Man-machine interface IHM Transmit: | Man-machine interface IHM Receive: |
| Commands Test commands | Physical magnitudes Alerts Test commands |
| PCMAP device Transmit: | PCMAP device Receive: |
| Commands Test commands Battery parameters Communication speed Real parameters after calibration | Physical magnitudes Converted gross values Module statuses Charger statuses Module alerts Charger alerts Date |

The physical magnitudes comprise instant measurements taken on the module by the measuring units, which are sent by the module to the PCMAP device: voltage of each cell, temperature of the module, cell current (positive on charging, negative on discharge), voltage of the module cells, and other information which are sent by the module to the device PCMAP and to the man-machine interface IHM: remaining percentage capacity of the module, power. The converted gross values are computed and memorized on the module. For their collection, the PCMAP device sends a request message to the module, which replies with the value or the date of acquisition of this value. These values may, for example, comprise one or more of the following: internal resistances $R_v$ of the cells, voltage V corresponding to measurement of the resistance $R_v$ of the cells.

The information on status transmitted by the module to the PCMAP device or man-machine interface IHM may, for example, comprise the fact that the module is off, on stand-by, in active mode, charging, discharging or other. The information on status sent by the charger CHG to the PCMAP device or man-machine interface IHM may, for example, comprise the fact that the charger is ready to function, that the voltage of the charger lies outside pre-determined tolerances, that the voltage of the charger is limited, that the temperature of the charger lies outside pre-determined tolerances. The commands transmitted by the PCMAP device or man-machine interface IHM may, for example, comprise a command to shut down the module, a command to activate the module. The commands transmitted by the PCMAP device may, for example, comprise a command to disenable alerts of the module, a command for module calibration.

The setpoint is a voltage setpoint for the charger, sent by the module ME or the PCMAP device to the charger CHG. The test commands comprise a test start command sent by the PCMAP device to the man-machine interface IHM which sends the PCMAP device a reply to this test command. The battery parameters are requested by a request message sent by the PCMAP device to the module ME, which sends back a reply message containing the value of the parameter indicated in the request message. These battery parameters comprise the serial number for example of the module ME, the battery capacity according to specifications, the temperature measurement period, the voltage polling period.

The alerts comprise messages sent by the module ME to the PCMAP device and to the man-machine interface IHM such as for example: a thermal runaway alert, heating anomaly alert, faulty measurement alert of voltage or temperature, deep discharge alert. The alerts also comprise a fault message sent by the charger to all the other elements. The log of alerts recorded by the module ME or the charger CHG can be collected by the PCMAP device. To do so, the PCMAP device sends the module ME or the charger CHG a request message to read a determined alert from among those recorded. The module or charger then sends back to the PCMAP device a reply message containing the values of this alert specified in the request message, each value being associated in the reply message with information on the date of the alert, having been recorded with the alert value.

The real parameters after calibration are the conversion coefficients of the analog measuring circuits dedicated to the measurement of voltage (cell, module) by unit 25, of current by unit 28 and of temperature by units 26, 27. The measurement circuit is synthesized by an affine-type law and uses two coefficients: a multiplier gain and an additive constant. Initially, default coefficients are provided which need to be affined by a calibration phase performed during functional factory testing. After calibration, the synthesis of the measured physical magnitudes is no longer made using the default coefficients, but with the real coefficients. These parameters are stored in non-volatile memory, e.g. on the board at 32, and are access-protected. The PCMAP device, on parameter-type request, is capable of reading the same. These parameters remain stored and can be used for the other message systems.

Second Message System for Cell Forming

The second message system comprises first messages which contain data needed for forming and which are sent by the modules ME and the chargers CHG, via the bus B, to the master forming device FOR at the latter's request using a client/server mode. The occurrence of requests by the master forming device FOR is pre-defined: either periodical or event-related.

In the CANopen embodiment, these first forming messages are in SDO format (Service Data Object). The modules ME and the chargers CHG act as SDO server, and the forming device FOR acts as SDO client. Exchange via SDO gives access to all the objects of a dictionary. This dictionary is used as interface between communication and application and comprises the following fields:

index: number of the object in the dictionary. It gives write and read access to the object.
  name: usual name of the object or of the data item,
  unit: unit of magnitude if applicable,
  coding: computer coding of the data item as per CANopen standard,
  sub-index: for complex data (grouping of data or aggregates), this allows possible classification with and without sub-index. For example, for an entity which can be broken down into sub-assemblies of same type:
  Index: 2000
  Name: Cell voltage
  Sub-index 1: voltage cell 1
  Sub-index 12: voltage cell 12.
  An SDO message may for example comprise 7 octets of data.

The second forming message system comprises second automatic safety messages between elements ME, CHG without any intervention by the master forming device FOR. The second, safety messages are sent in real time asynchronously and cyclically with the highest priority. The second, safety messages comprise:

a message MSG1 transmitted by the charger CHG to the receive-associated module ME, transmitting its status and possible alert (fault) with recurrence of around one second for example, a message MSG2 transmitted by the module ME to the receive-associated charger CHG, transmitting the charge setpoint at a shorter recurrence than for messages MSG1 and MSG3, e.g. around 150 milliseconds, a message MSG3 transmitted by the module ME to the forming device FOR, transmitting statuses and alerts of the module ME with a recurrence of around one second for example.

Once the module ME is in operational forming mode, it verifies regular receiving of messages MSG1. If the module ME detects a problem, indicated by absence of receipt of messages MSG1 or by a message MSG1 indicating a voltage or temperature of the charger CHG lying outside prescribed tolerances or indicating an alert, the module ME takes up a prescribed, safe fall-back position. Once the charger CHG is in operational forming mode, it verifies regular receiving of messages MSG2. If the charger CHG detects a problem, indicated by absence of receipt of messages MSG2, the charger CHG takes up a prescribed, safe fall-back position. In the CANopen embodiment, these second safety messages are in PDO format (Process Data Object). A PDO message may comprise 8 octets of data for example.

Third Message System for Cell Utilization

This third message system provides for group messages sent both to a module ME and to its associated charger CHG. For this purpose, n addresses are defined of groups MEi/CHGi where i lies between 1 and n. These group messages may be write messages towards the modules and chargers.

A synchronization mechanism is used, driven by the master module ME1, which prevents the modules and/or chargers from transmitting the same data at the same time so as not to overload the bus B at any one time. For this purpose, the master module ME1 transmits a synchronization frame towards the other elements. This particularly allows the PCMAP device and the master module ME1 not to receive a large volume of information over a very short period, but instead data that is uniformly distributed over time. This synchronization frame is not provided in the first message system in the first environment.

Figure 8:
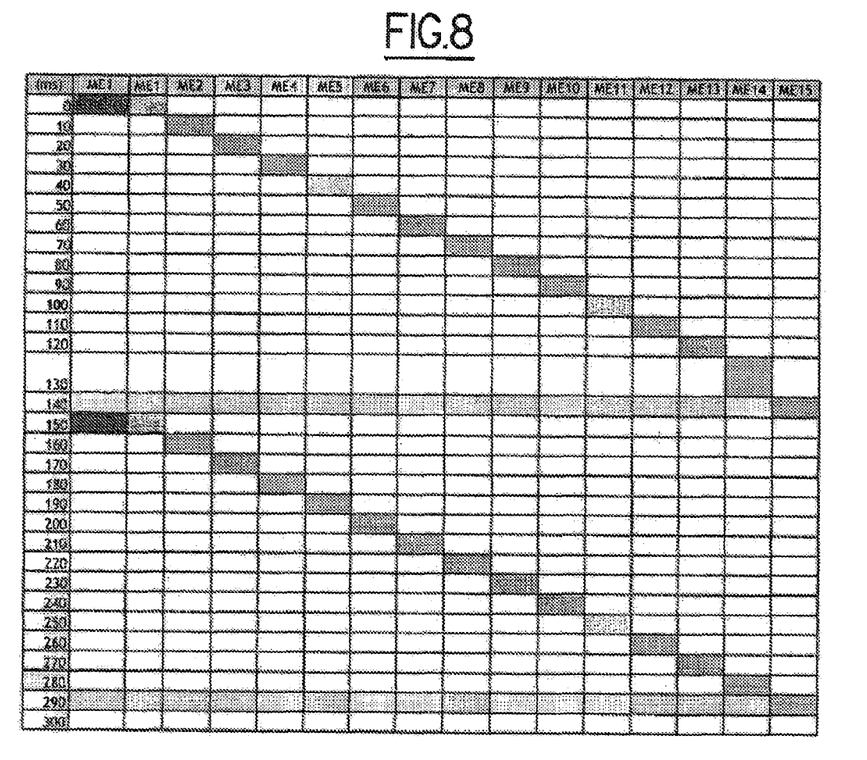
FIG. 8 is a table of the occupancy of a time synchronization frame by different modules along the abscissae X-axis, time being represented along the ordinate Y-axis.

When the slave modules ME2 to MEn have received the synchronization frame, they synchronize themselves therewith so that each transmits its data with a different delay over the bus B, each in a module frame. This synchronization frame may be periodical for example of period T. The slave modules MEi each having a different address ADRi where i lies between 1 and n, they transmit their data over the bus B with a delay of R=k*ADRi for example, where k is a time constant. For example, in FIG. 8, the slave modules MEi, with i lying between 1 and n, transmit their data over the bus B for example with a delay of R=i*T', in which T' is a time constant equal to T/n. For example, in FIG. 8 T=150 ms, n=15 and T'=10 ms, in which the transmission time slots for data of modules ME1 to ME15 are indicated by the dark boxes in a diagonal line. Evidently, in other examples of embodiment, T' may be less than T/n.

The data concerned for transmission by the modules may for example comprise:
the physical magnitudes (e.g. measurements)
the alerts,
the statuses,
the setpoint to charger.

The same applies to the chargers CHG1 to CHGn, each transmitting:
the fault message of the charger CHG associated with the module,
the status message of the charger CHG associated with the module.

The master module ME1 collects the data sent by the other modules and chargers. In the event of absence of one of the module frames, an alert is generated whose consequence is to activate all alerts in the direction of the supervisor SVE and to zero the maximum permitted discharge current and the maximum permitted cell regeneration current. The sending of the other messages can be managed asynchronously. In the event of absence of a synchronization frame, the modules ME and chargers CHG transition to safe mode, in which the voltage setpoint for the charger is set at a minimum value.

Communication between the master module ME1 and the supervisor SVE, in addition to the messages of the first message system, may for example comprise the following messages:

a first message sent by the module ME1 to the supervisor SVE giving the status, total voltage of the battery pack, battery level (minimum of the levels of the modules), maximum permitted discharge current value and maximum permitted cell regeneration current value (cell regeneration occurring when the machine VE recharges the cells), a second message sent by the module ME1 to the supervisor SVE, the second message sending one or more alerts, such as a thermal alert (e.g. in the event of overstepping a pre-defined temperature), a critical voltage alert (e.g. if the voltage of a cell lies outside prescribed tolerances), a general alert (e.g. in the event of a faulty thermal fuse 35 on a module, or thermocouple failure of unit 26 or 27 measuring temperature on a module), a third message sent by the module ME1 to the supervisor SVE, the third message sending the value of the current supplied by or absorbed by the pack on terminals 23, 24 and/or the maximum temperature value of the pack, a fourth message from the supervisor SVE to the module ME1, containing at least one of the following:
an alert acknowledgement
a consumption request (request for travel in applications to the motor drive of an automotive vehicle). If any one of the modules ME of the battery pack is on stand-by or shut down, the receiving by module ME1 of the consumption request message causes the module ME1 and the other modules ME of the pack to change over to active mode. When the modules ME of the pack have transitioned to active mode, the module ME1 sends back a transition-to-active-mode message to the supervisor SVE. It is only when the supervisor SVE has received this message of transition to active mode that the machine VE is authorized to operate (i.e. to travel in application to the motor drive of a motor vehicle).
a request to place the battery pack on standby. When the master module ME receives a standby request, it re-transmits the request to the other modules ME to cause them to be placed on standby. The standby mode of the battery pack is activated when all its modules ME are on standby.
a request to shut down the battery pack. When the master module ME receives a shut-down request, it re-transmits this request to the other modules ME to cause them to shut down. The shut-down mode of the battery pack is caused by transitioning to shut-down of at least one of its modules ME.

In the first, second and third message systems, the messages comprises transmission priorities on the bus B. These priorities may have the decreasing order given below for example, for the first, second and third message systems:
- very high priority for the message transmitting information on message system configuration sent by the configuring element to the modules ME,
- very high priority for transmission of a synchronization frame sent by the master module ME1,
- high priority for transmission by the modules ME of the alerts, the physical magnitudes (e.g. measurements), the setpoint to charger,
- high priority for transmission by the charger of a fault message or status message,
- high priority for transmission of commands by the master module ME1 to the slave modules,
- medium priority for transmission by the modules ME of converted gross values, statuses, parameters, dates of alerts,
- medium priority for transmission of other messages sent by the PCMAP device,
- low priority for transmission by the master module ME1 to the supervisor SVE of the first, second and third messages indicated above,
- low priority for transmission by the supervisor SVE to the master module ME1 of the fourth message indicated above.

In the event of loss of connection of the network B, the modules are placed in shut-down mode which is the safest fall-back mode.

What is claimed is:

1. A battery module, comprising:
a plurality of rechargeable and dischargeable, electric energy storage cells;
two external terminals for cell utilization;
a message communication infrastructure comprising at least one communication access with the outside of the module;
a module control unit, comprising a message processing unit, connected to the communication infrastructure to send and receive messages over the communication infrastructure;
wherein at least two of the message systems are chosen from among:
  (a) a first message system for cell characterizations;
  (b) a second message system for cell forming; and
  (c) a third message system for utilization of a battery pack comprising several modules connected via their user terminals, when the pack is associated with a consumer machine for the purpose of supplying it with electric energy;
are provided in the message processing unit, which is configurable into any one of the message systems provided thereupon for utilization of the communication infrastructure.

2. The battery module according to claim 1, wherein the module control unit comprises:
means to receive information for message system configuration;
a permanent memory to store the information on message system configuration; and
automatic configuration means for configuring its message processing unit as per the message system corresponding to the information on message system configuration present in the permanent memory.

3. The battery module according to claim 2, wherein the automatic configuration means comprise means to poll the value of the information on message system configuration present in the permanent memory and means for automatic selection of the message system corresponding to the value indicated by this information on message system configuration.

4. The battery module according to claim 1, wherein the communication infrastructure is of bus type, to allow connection of the external access to a communication bus.

5. The battery module according to claim 4, wherein the first message system comprises means enabling utilization of the module in a first material environment comprising the following elements connected via their message communication access to the communication bus: a device to download message systems onto the module, comprising means to send to the module the information on configuration of the message processing unit of the module as per the first message system, a charger connected to the module via a transport link transporting charge electric current for the purpose of charging its cells with electric energy, a man-machine interface to enable a user to send operating command messages to at least one of the charger and to the module, and to receive from the at least one of the charger and module the statuses thereof.

6. The battery module according to claim 1, further comprising a measuring unit to measure the voltage and current of the cells and the temperature of the module, the control unit being able to send the measurements over the communication infrastructure by at least one measurement-sending message provided in each message system.

7. The battery module according to claim 5, wherein the message processing unit further comprises a receiver to receive a message from the downloading device, conveying at least one calibration parameter for the measuring unit in the second message system, and storage to store said calibration parameter in a memory.

8. The battery module according to claim 1, wherein the first message system is asynchronous.

9. The battery module according to claim 1, wherein the communication infrastructure is of bus type, to allow connection of the external access to a communication bus, the second message system comprises means enabling utilization of the module in a second material environment for cell forming, comprising the following elements connected via their message communication access to the communication bus: a plurality of modules whose user terminals are not connected together, at least one charger connected to the modules via at least one transport link for transporting charge electric current for the purpose of charging their cells with electric energy and able to be placed in charge-on status or charge-off status, a forming device to form the cells of the modules comprising a discharge bank connected to the user terminals of the modules and able to be placed in discharge-on status of the module cells or discharge-off status of the module cells, the forming device comprising means to send a message of charge-on command to the charger and of discharge-off command to the discharge bank and a message of charge-off command to the charger and of discharge-on command to the discharge bank.

10. The battery module according to claim 9, wherein the message processing unit comprises means to produce at least one message from among the following messages in the second message system:
  a message from the module to the associated charger carrying the charge setpoint to charge the module cells;
  a message from the module to the forming device carrying the statuses and alerts of the module;
the message processing unit further comprises means to receive a status message sent by the charger to the module the status message carrying the status of the charger and any possible alert of the charger, to cause the module to transition to a safe fall-back position in the event of absence of the charger status message or if the status message of the charger indicates an alert or a voltage or temperature status lying outside prescribed tolerances.

11. The battery module according to claim 1, wherein the second message system is in CANopen format.

12. The battery module according to claim 1, wherein the communication infrastructure is of bus type, to enable connection of the external access to a communication bus, the third message system comprises means allowing utilization of the module in a third material environment for cell utilization comprising the following elements connected via their message communication access to the communication bus: a plurality of modules whose user terminals are connected together, at least one charger connected to the modules via at least one transport link transporting charge electric current for the purpose of charging their cells with electric energy, a supervisor of the consumer machine.

13. The battery module according to claim 1, wherein the message processing unit further comprises means to produce charge setpoints for its cells, in the third message system, intended for a charger.

14. The battery module according to claim 1, wherein in the third message system, the module is able to be configured as master module or as slave, the message processing unit of the module is configured as master module comprising means to send command messages to the other slave modules, and the message processing unit of the module is configured as a slave module further comprising means to carry out command messages from the master module.

15. The battery module according to claim 14, wherein the module is master, the message processing unit further comprises means to produce at least one message from among the following messages in the third message system:
a first message sent from the module to the supervisor sending at least one of the data items from among the status of the battery pack, the total voltage of the battery pack, the level of the battery pack, a maximum permitted discharge current and a maximum permitted cell regeneration current;
a second message for sending at least one alert from the module to the supervisor; and
a third message for sending from the module to the supervisor the value of the current supplied by or absorbed by the pack and/or the value of the maximum temperature of the pack.

16. The battery module according to claim 14, wherein the module is master, the message processing unit further comprises in the third message system a means to receive a fourth message for sending from the supervisor to the module at least one of the following:

an alert acknowledgement;
a consumption request, causing transitioning of the pack modules to active mode, and when the modules of the pack have changed over to active mode, the sending by the module of a transition-to-active-mode message to the supervisor for authorizing functioning of the consumer machine;
a request to place the modules of the battery pack on standby; and
a request to shut down the modules of the battery pack.

17. The battery module according to claim 14, wherein the module is master, and the message processing unit further comprises means to transmit a synchronization frame for the messages of the modules in the third message system.

18. The battery module according to claim 1, wherein the communication infrastructure is of CAN bus type.

19. The battery module according to claim 1, wherein the messages of the first, second and third message systems have as order of priority for transmission on the bus:
very high priority for the message transmitting information on message system configuration;
very high priority for transmission of a synchronization frame by the master module;
high priority for transmission by the modules of alerts, data, setpoint to the charger;
high priority for transmission by the charger of a fault message or status message;
high priority for transmission of commands from the master module to the slave modules;
low priority for transmission from the master module to the supervisor of first second and third messages; and
low priority for transmission of the fourth message from the supervisor to the master module.

20. A pack of several battery modules according to claim 1, wherein the communication infrastructures of the modules are connected to a communication bus for the transmission of the messages.

21. The pack according to claim 20, wherein the user terminals of the modules are electrically connected together to utilize the battery pack, only one of the modules is configured as master module, and the other modules are configured as slave modules of this master module for the messages of the third message system, so that the slave modules transmit or receive their messages of the third message system via the master module.

22. The pack according to claim 21, wherein each module further comprises means to produce data on the functioning of the cells of the module, the master module further comprises means to transmit a synchronization frame on the bus so that the modules transmit their data-carrying messages on the bus at prescribed times different from each other.

* * * * *